United States Patent Office 2,944,647
Patented July 12, 1960

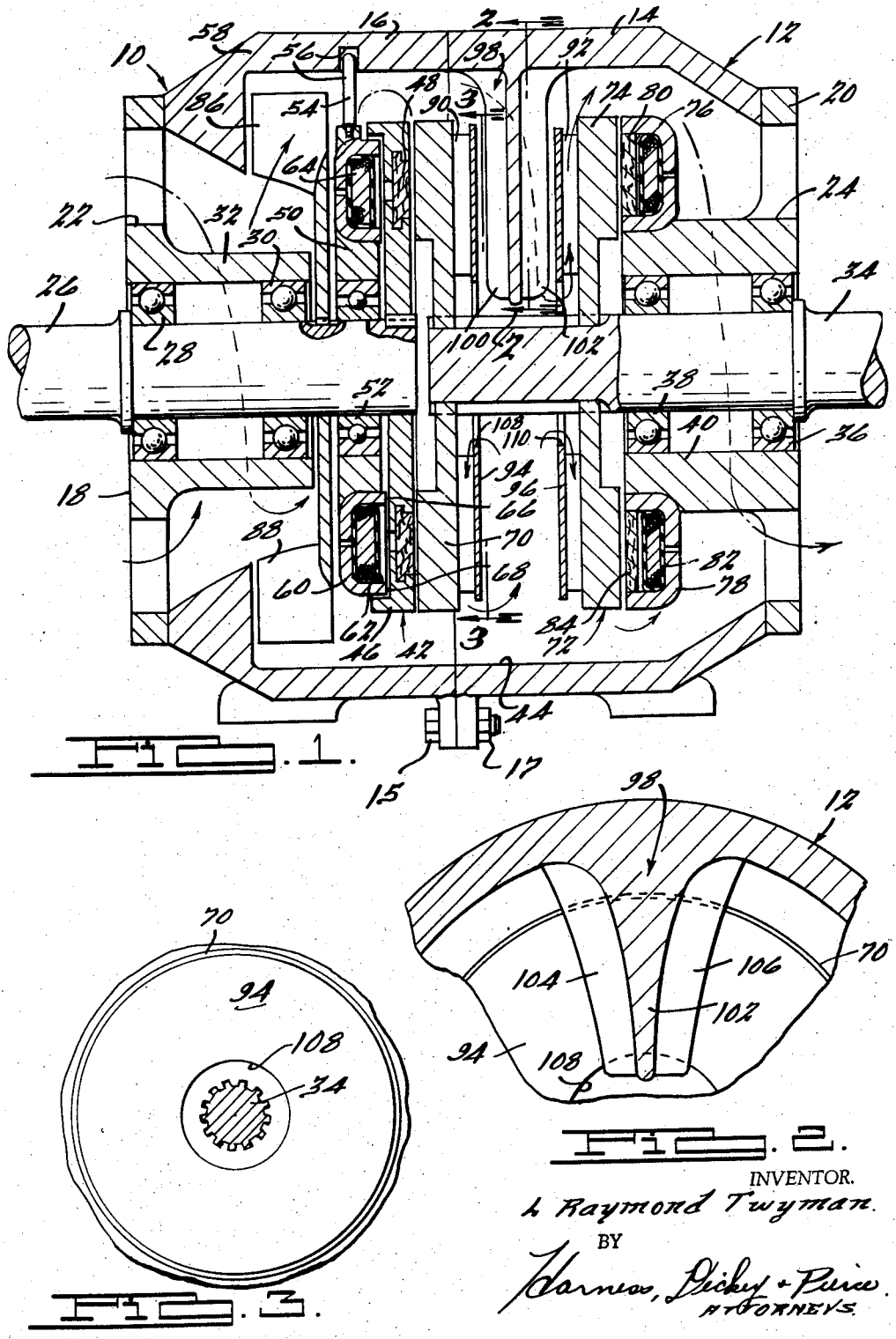

2,944,647
AIR COOLED CLUTCH-BRAKE

L Raymond Twyman, P.O. Box 204, Bloomfield Hills, Mich.

Filed May 17, 1957, Ser. No. 659,922

8 Claims. (Cl. 192—18)

This invention relates to transmissions and, more particularly, to an improved enclosed, intermittent motion, power transmission device.

Heretofore, it has been common practice in industry to employ various combination clutch-brake devices for controlling the intermittent stop and run cycles of various mechanisms. For example, clutch-brake assemblies have been applied to presses, materials handling equipment, machine tools and many other types of machinery, the clutch-brake assemblies being actuated by any suitable means, as for example, mechanically, hydraulically, pneumatically or electro-magnetically actuated. While the operating conditions under which prior enclosed clutch-brake assemblies function may occasionally be such that the heat generated by the clutch and brake actions is not appreciable, prior enclosed clutch-brake assemblies have been subject to the defect that when cycling rates and load conditions are increased there are serious limitations to satisfactory operation with relatively high cycling rates or load factors because of high temperature conditions resulting from the heat generated by the friction between the clutch elements or between the brake elements.

An object of the invention is to overcome disadvantages in prior enclosed clutch, brake, and clutch-brake assemblies of the indicated character and to provide an improved enclosed power transmission device incorporating improved means which enables satisfactory operation thereof with relatively high cycling rates and relatively high load factors.

Another object of the invention is to provide an improved enclosed power transmission device incorporating improved means for dissipating heat generated during operation of the device.

Another object of the invention is to provide an improved enclosed power transmission device that makes possible the rapid cycling of driven mechanisms by repetitively controlling the start and stop rotary drive action.

Another object of the invention is to provide an improved enclosed power transmission device that is economical to manufacture and assemble, durable, efficient and reliable in operation.

Still another object of the invention is to provide an improved intermittent motion, enclosed power transmission device that may be operated at relatively high cycling rates and under relatively high load conditions for long periods of time without overheating.

The above as well as other objects and advantages of the present invention will become apparent from the following description, the appended claims, and the accompanying drawing, wherein:

Figure 1 is a longitudinal sectional view of a rotary, intermittent motion, power transmitting device embodying the present invention;

Figure 2 is a transverse sectional view of a portion of the structure illustrated in Figure 1, taken on the line 2—2 thereof; and Figure 3 is a transverse sectional view of a portion of the structure illustrated in Figure 1, taken on the line 3—3 thereof.

Referring to the drawing, the present invention is shown embodied in a rotary, intermittent motion, power transmitting device, generally designated 10, which is adapted to be inserted between the driving shaft of a prime mover, such as an electric motor, and the driven shaft of various mechanisms such as presses, machine tools, materials handling equipment, and various other types of machinery having rotary driven shafts through which power is supplied thereto. While the present invention is shown incorporated in an electro-magnetically actuated device, it will be understood that the present invention is equally applicable to hydraulically, mechanically, pneumatically, dynamically or eddy current actuated devices. The power transmission device 10 includes a casing 12 that may be formed, for example, in two sections 14 and 16 which are secured together by any desired or conventional means, as by bolts 15 secured by nuts 17. A pair of end members 18 and 20 are provided which are fixed to the opposite end portions of the casing 12, the end member 18 and the adjacent end portion of the casing 12 defining a plurality of angularly spaced air intake ports 22, and the end member 20 defining a plurality of angularly spaced exhaust ports 24. A power input shaft 26 is provided which is journaled for rotation in bearings 28 and 30 carried by a boss 32 provided on the end member 18, and a power output shaft 34 is provided which is mounted for rotation in bearings 36 and 38 carried by a boss portion 40 provided on the end member 20.

In order that the driving and driven shafts may be coupled, a clutch mechanism generally designated 42 is provided which is mounted in the chamber 44 defined by the casing 12. The clutch mechanism 42 includes a driving plate 46 which is keyed to the inner end portion of the driving shaft 26, the driving plate 46 being formed of a magnetic material and carrying a suitable clutch facing member 48 which may, for example, be formed of conventional nonmagnetic clutch facing material. An actuating member 50 is provided which is mounted on bearings 52 carried by the input shaft 26, the actuating member being fixed against rotation by a pin 54, the radially inner end portion of which threadably engages the actuating member 50 while the radially outer end portion is disposed in a slot 56 provided in the wall 58 of the casing 12. An annular, generally channel sectioned flux ring 60 is fixed to the periphery of the actuating member 50, the ring 60 being formed of a magnetic material and defining an annular slot 62 which carries an electro-magnetic coil 64. The edge portions 66 and 68 of the ring 60 are preferably mounted in relatively close proximity to the member 46 so as to reduce the air gap between the flux ring 60 and the rotating member 46 to a minimum.

The clutch mechanism 42 also includes an armature or driven plate 70 which is splined or otherwise mounted on the driven shaft 34 in a manner which permits relative movement of the armature 70 axially of the driven shaft 34 and into engagement with the driving plate 46. With such a construction, when the coil 64 is electrically energized, the armature 70 is moved into engagement with the plate 46 by the magnetic action of the coil with the result that the driven shaft 34 is clutched to the driving shaft 26 through the driving plate 46 and the armature 70.

In order that the driven shaft may be rapidly decelerated, a brake mechanism generally designated 72 is also provided. The brake mechanism includes an armature or brake plate 74 formed of magnetic material and splined to the driven shaft 34, and an electromagnetic brake 76 which is comprised of a generally channel sectioned flux ring 78 formed of magnetic material that is fixed to the inner end portion of the hub 40. The member 78 defines a channel 80 in which is mounted an electro-magnetic coil 82, and a suitable brake lining 84 is also mounted in the channel 80 for braking engagement with the armature 74. With such a construction, when the electro-magnetic coil 82 is energized, the armature 74 moves axially of the driven shaft 34 due to the magnetic action of the coil and into braking engagement with the brake lining 84 so as to stop the rotation of the driven shaft 34. It will be appreciated that the clutch and brake coils will be energized successively rather than simultaneously, it being preferred that only the clutch or the brake coil be energized at any one time.

In the operation of the transmission, whenever the clutch 42 is engaged, the input shaft 26 drives the output shaft 34 through the clutch mechanism. The brake mechanism 72 can be applied when the clutch is disengaged thereby rapidly decelerating the output shaft 34 of the transmission assembly and any driven mechanism coupled to it. Thus, the transmission makes possible the rapid cycling of any driven mechanism by repetitively controlling the start and stop rotary drive action. Such acceleration and deceleration results in the generation of heat that may be measured by the energy absorbed in the clutch and brake frictional surfaces.

In accordance with the present invention, means is provided for rapidly dissipating the heat generated by the clutch and brake mechanisms confined within the casing 12. In accordance with the present invention, a fan member 86 is provided which is mounted on the input shaft 26 for rotation therewith. The fan 86 includes a plurality of angularly spaced blades 88 which are disposed within the chamber 44 adjacent the air intake ports 22 and which are effective to create a generally spirally flow of air through the chamber 44 to the exhaust ports 24. It will be noted that the cooling action of the fan 86 will be continuous as long as the input shaft 26 is rotating, irrespective of whether the driven output shaft 34 is rotating or stopped. A continuous circulation of air is thus made available through the casing so that cooling of the clutch and brake friction surfaces is maintained.

A plurality of radially extending vanes 90 and 92 are also provided which are mounted on the axially inner sides of the armatures 70 and 74, the vanes 90 and 92 being angularly spaced around the armatures and extending in a general radial direction from the axis of rotation of the armatures. The radially inner ends of the vanes terminate at a position near, but spaced from the driven shaft 34 while the radially outer ends of the vanes 90 and 92 terminate adjacent the peripheral portions of the armatures 70 and 74. If desired, shroud rings 94 and 96 may be fixed to the edge portions of the vanes 90 and 92 so as to substantially confine the flow of air induced by the vanes 90 and 92 between the vanes and the armatures.

At a position intermediate the armatures 70 and 74, a baffle member 98 is provided which extends radially inwardly toward the axis of rotation of the driven shaft 34, the radially outer end of the baffle member 98 being fixed to the wall of the casing 12 while the radially inner end of the baffle member terminates at a position near, but spaced from the driven shaft 34. As shown in Figures 1 and 2, the baffle member 98 includes a pair of axially extending fin portions 100 and 102 and a pair of transversely extending fin portions 104 and 106. While only one baffle member 98 is shown in the embodiment of the invention illustrated, it will be understood that any desired number of such baffle members may be utilized as conditions require.

In the operation of the transmission, air is drawn in through the intake ports 22 by the fan blades 88, and the air is discharged from the fan blades through the annular clearance areas between the periphery of the clutch mechanism 42 and the casing 12, the air stream being given a generally spiral travel pattern by the motion of the continuously rotating fan and clutch parts while the air moves from the intake ports to the exhaust ports within the casing. As the spiralling air stream advances axially of the casing between the clutch mechanism 42 and the brake mechanism 72, the fin portions of the baffle member 98 impede the axial component of flow and divert the spirally traveling air so that a portion of the air stream is deflected toward the center line of the rotating clutch and brake assemblies, contra to the normal centrifugal flow pattern. This deflected flow pattern forces relatively cool air to the center of the revolving clutch and brake elements which absorb the major portion of the frictional heat generated. The deflected air then flows through the openings 108 and 110 defined by the shroud rings 94 and 96, and the vanes 90 and 92 fixed to the armatures 70 and 74 then force the air near the center of the unit outwardly by centrifugal action thereby cooling the rotating parts with the relatively cool deflected air and discharging the heated air in the annular clearance areas between the clutch and brake elements and the casing where it mixes with the cool incoming air and is subsequently discharged through outlet ports 24 at the right end of the housing, as viewed in Figure 1. It has been found that the above described construction greatly improves the rate at which the clutch and brake mechanisms can be cooled and the heat removed from the chamber 44 defined by the casing 12, and that high cycling rates, for example in the order of 160 cycles per minute, may be utilized without overheating and without fading of the clutch and brake mechanisms.

While a preferred embodiment of the invention has been shown and described, it will be understood that various changes and modifications may be made without departing from the spirit of the invention.

What is claimed is:

1. In a power transmitting device, the combination including a casing defining a chamber having inlet and outlet openings, a rotatable torque transmitting member disposed within said casing, fan means disposed within said chamber intermediate said inlet and outlet openings for creating an annular, generally spiralling flow of air through the chamber from the inlet to the outlet openings, means for deflecting the rotational component of the air flowing through the chamber radially inwardly of said casing and toward the axis of rotation of said torque transmitting member, and means carried by said torque transmitting member for forcing air in the portion of the chamber adjacent said axis of rotation outwardly to the periphery of the chamber.

2. A power transmitting device comprising, in combination, a casing defining a chamber having inlet and outlet openings, a torque transmitting member mounted for rotation about an axis within said casing, fan means disposed within said chamber adjacent said inlet openings for creating a generally spiralling flow of air through the chamber from the inlet to the outlet openings, means fixed to said casing for deflecting the rotational component of the air flowing through the chamber radially inwardly of said casing and toward the axis of rotation of said torque transmitting member, and additional cooling means carried by said member.

3. A power transmitting device comprising, in combination, a casing defining a chamber having inlet and outlet openings, a clutch mechanism disposed within the chamber, fan means disposed within said chamber intermediate said inlet and outlet openings for creating a generally spiralling flow of air through the chamber from the inlet to the outlet openings, and means carried by said casing intermediate said mechanism and the outlet openings and effective to direct the rotational component of the air flowing through the chamber radially inwardly of said casing and toward said mechanism.

4. In a power transmitting device, the combination comprising a housing defining a chamber having inlet and outlet openings, a brake mechanism disposed within the chamber, fan means disposed within said chamber intermediate said inlet and outlet openings for creating a generally spiralling flow of air through the chamber from the inlet to the outlet openings, and means carried by said housing intermediate said mechanism and the outlet openings and effctive to direct the rotational component of the air flowing through the chamber radially inwardly of said housing and toward said mechanism.

5. In a power transmitting device, the combination comprising a housing defining a chamber having inlet and outlet openings, a clutch mechanism and a brake mechanism disposed in spaced substantially coaxial relationship within the chamber, fan means disposed within said chamber intermediate said inlet and outlet openings for creating a generally spiralling flow of air through the chamber from the inlet to the outlet openings, and means carried by said housing intermediate said mechanisms and effective to direct the rotational component of the air flowing through the chamber radially inwardly of said housing and between said mechanisms.

6. In a power transmitting device, the combination including a housing defining a chamber having inlet and outlet openings, a rotatable clutch mechanism disposed in the chamber, a plurality of radially extending vane members carried by said clutch mechanism, fan means disposed within said chamber intermediate said inlet and outlet openings for creating a generally spiralling flow of air through the chamber from the inlet to the outlet openings, and means effective to deflect the rotational component of the air flowing through the chamber defined by said housing radially inwardly of said housing and toward the radially inner ends of said vane members.

7. In a power transmitting device, the combination including a housing defining a chamber having inlet and outlet openings, a brake mechanism disposed in the chamber and having a rotatable brake plate, a plurality of vane members carried by said brake mechanism, fan means disposed within said chamber intermediate said inlet and outlet openings for creating a generally spiralling flow of air through the chamber from the inlet to the outlet openings, and means effective to deflect the rotational component of the air flowing through the chamber defined by said housing radially inwardly of said housing and toward the axis of rotation of said plate and over said vane members.

8. In a power transmission device, the combination including a housing defining a chamber having inlet and outlet openings, a torque transmitting member mounted for rotation within the chamber, means disposed within said chamber intermediate said inlet and outlet openings for creating a generally spiralling flow of air through the chamber from the inlet to the outlet openings, baffle means for deflecting the rotational component of the air flowing through the chamber radially inwardly of said housing and toward the axis of rotation of said member, and vane means for forcing air in the central portion of the chamber outwardly toward the periphery thereof, said vane means including shroud means effective to confine the air flowing over said vane means adjacent said torque transmitting member.

References Cited in the file of this patent

UNITED STATES PATENTS

| | | |
|---|---|---|
| 2,095,094 | Glasner | Oct. 5, 1937 |
| 2,454,471 | Momberg | Nov. 23, 1948 |
| 2,584,190 | Danly et al. | Feb. 5, 1952 |
| 2,674,356 | Eason | Apr. 6, 1954 |
| 2,739,251 | Ingalls | Mar. 20, 1956 |
| 2,742,129 | Palm | Apr. 17, 1956 |
| 2,818,949 | Giffen | Jan. 7, 1958 |

FOREIGN PATENTS

| | | |
|---|---|---|
| 973,180 | France | Feb. 8, 1951 |
| 273,578 | Switzerland | May 16, 1951 |